United States Patent [19]

Yatomi

[11] Patent Number: 5,313,343
[45] Date of Patent: May 17, 1994

[54] MAGNETIC RECORDING OR REPRODUCING APPARATUS

[75] Inventor: Toshiya Yatomi, Kanagawa, Japan

[73] Assignee: Canon Kabushiki Kaisha, Tokyo, Japan

[21] Appl. No.: 720,749

[22] Filed: Jun. 25, 1991

[30] Foreign Application Priority Data

Jun. 28, 1990 [JP] Japan .................. 2-168328
Jun. 28, 1990 [JP] Japan .................. 2-168329

[51] Int. Cl.$^5$ .................. G11B 15/18; G11B 15/46
[52] U.S. Cl. .................. 360/71; 360/73.05; 360/73.09; 360/73.11; 360/73.14
[58] Field of Search .......... 360/71, 69, 73.05, 73.09, 360/73.11, 73.14

[56] References Cited

U.S. PATENT DOCUMENTS

| | | | |
|---|---|---|---|
| 4,341,363 | 7/1982 | Inatome | 360/73.05 |
| 4,400,745 | 8/1983 | Shu | 360/73.11 |
| 4,696,439 | 9/1987 | Sukigara et al. | 360/73.14 |
| 4,786,992 | 11/1988 | Tajima et al. | 360/73.14 |
| 4,807,107 | 2/1989 | Fincher | 360/74.3 |
| 5,085,379 | 2/1992 | Uchikoshi et al. | 360/73.14 |
| 5,125,592 | 6/1992 | Sato | 360/71 |

*Primary Examiner*—Timothy P. Callahan
*Attorney, Agent, or Firm*—Robin, Blecker, Daley & Driscoll

[57] ABSTRACT

A magnetic recording or reproducing apparatus for recording or reproducing a signal on or from a magnetic tape while causing the magnetic tape to travel in the state of being wrapped around a rotary head drum provided with a magnetic head. The apparatus includes a speed detecting part for detecting a speed of the magnetic tape, a supply-reel-side tension detecting part for detecting a tension of the magnetic tape between the rotary head drum and a supply reel, a take-up-reel-side tension detecting part for detecting a tension of the magnetic tape between the rotary head drum and a take-up reel, and a control signal switching part for switching control signals in accordance with whether the magnetic tape is made to travel in a forward or rearward direction.

24 Claims, 5 Drawing Sheets

MAGNETIC RECORDING OR REPRODUCING APPARATUS

BACKGROUND OF THE INVENTION

1. Field of the Invention

The present invention relates to a magnetic recording or reproducing apparatus, such as a video tape recorder (hereinafter referred to as a "VTR"), which has a rotary head drum and which is arranged to record or reproduce a signal by using a magnetic tape and, more particularly, to a reel servo system for causing a magnetic tape to travel.

2. Description of the Related Art

This kind of magnetic recording or reproducing apparatus is provided with a magnetic-tape transporting system in which recording or reproduction is carried out by causing a magnetic tape to travel at a prescribed speed from a supply reel to a take-up reel in a forward (FWD) direction while keeping the magnetic tape wrapped around a rotary head drum equipped with a magnetic head by a predetermined angle such as about 180 degrees or about 360 degrees. The magnetic-tape transporting system is capable of rewinding a wound magnetic tape from the take-up reel to the supply reel, that is, in a rearward (REW) direction. The magnetic recording or reproducing apparatus is also provided with a reel servo system for causing the magnetic tape to optimally travel by controlling the driving of the magnetic-tape transporting system.

FIG. 1 is a block diagram showing a conventional type of reel servo system. The shown reel servo system includes a supply reel S, a take-up reel T, and control signal switching devices R1 and R2. The shown setting of the control signal switching devices R1 and R2 represents a magnetic tape 2 being made to travel in the FWD direction. The reel servo system also includes a rotary head drum 1 equipped with a magnetic head (not shown) for performing magnetic recording on the magnetic tape 2 or picking up a signal therefrom, a tension detecting pin 3 mounted on the entry side of the rotary head drum 1 relative to the FWD travel of the magnetic tape 2, the pin 3 being arranged to move its position in accordance with the tension of the magnetic tape 2, a tension detecting pin 4 mounted on the exit side of the rotary head drum 1 relative to the FWD travel of the magnetic tape 2, a Hall element 5 for measuring the value of a tension which is applied to the magnetic tape 2 from a position to which the pin 4 has been moved, a Hall element 6 for measuring the value of a tension which is applied to the magnetic tape 2 on the entry side of the rotary head drum 1, a timer roller 7 for outputting a magnetic-tape travel signal while it is rotating with the travel of the magnetic tape 2, a pulse interval measuring device 8 for measuring the pulse interval of a magnetic-tape travel signal outputted from the timer roller 7, a coefficient multiplier 9 for multiplying input data by its coefficient and outputting the result, a loop filter 10 for stabilizing control provided over the travelling speed of the magnetic tape 2, a coefficient multiplier 11, a loop filter 12 for stabilizing control provided over the tension of the magnetic tape 2 on the side of the supply reel S, a coefficient multiplier 13, a loop filter 14 for stabilizing control provided over the tension of the magnetic tape 2 on the side of the take-up reel T, a driver 15 for driving a reel motor 17 coupled to the supply reel S, a driver 16 for driving a reel motor 18 coupled to the take-up reel T, the reel motor 17 for driving the supply reel S, the reel motor 18 for driving the take-up reel T, analog-to-digital (A/D) converters 19 and 20, and digital-to-analog (D/A) converters 21 and 22.

In the arrangement shown in FIG. 1, while the magnetic tape 2 is being made to travel in the FWD direction, the position of the pin 3 which is made to move by a tension applied to the magnetic tape 2 on the entry side of the rotary head drum 1 is detected on the basis of an output voltage from the Hall element 6. The output voltage from the Hall element 6 is converted into digital data by the A/D converter 19, and the digital data is compared with a data value corresponding to a reference tension and the result is outputted as error data. The multiplier 11 multiplies the output error data by its coefficient and inputs the result to the loop filter 12. The output data from the loop filter 12 is converted into an analog signal by the D/A converter 21 and inputted to the driver 15 for the supply reel S. The reel motor 17 coupled to the supply reel S is controlled in accordance with the output from the driver 15 so that the tension applied to the magnetic tape 2 between the rotary head drum 1 and the supply reel S is maintained at a reference value.

The reel motor 18 coupled to the take-up reel T is placed under speed control using the magnetic-tape travel signal supplied from the timer roller 7. More specifically, the pulse interval measuring device 8 measures the period of a signal outputted from the timer roller 7 to provide magnetic-tape speed data. The speed data is compared with reference speed data to obtain speed error data. The coefficient multiplier 9 multiplies the speed error data by its coefficient and supplies the result to the loop filter 10. The data signal passed through the loop filter 10 is converted into a analog signal by the D/A converter 22. The converted analog signal is supplied as a control signal to the driver 16 coupled to the take-up reel T, thereby providing speed control over the reel motor 18 coupled to the take-up reel T.

If the magnetic tape 2 is made to travel in the REW direction, the control signal switching devices R1 and R2, respectively, are switched correspondingly so that the reel motor 17 coupled to the supply reel S which is operative as a tape receiving side is placed under speed control in a manner similar to the above-described manner In the meantime, the reel motor 18 coupled to the take-up reel T which is operative as a tape sending side is controlled so that the tension of the magnetic tape 2 wrapped around the rotary head drum 1, i.e., the tension applied to the magnetic tape 2 which is measured through the pin 4 nearer to the take-up reel T, i.e., on the tape sending side, can be maintained at a reference value.

However, the above-described conventional example has a number of disadvantages. Referring to, for example, the state of travel of the magnetic tape 2 which is transported by reel rotation, while the magnetic tape 2 is being made to travel in the FWD direction for recording or reproduction, the reel motor 17 coupled to the supply reel S is controlled on the basis of the tension applied to the magnetic tape 2 on the entry side of the rotary head drum 1. While the magnetic tape 2 is being made to travel in the REW direction for rewinding, the reel motor 18 coupled to the take-up reel T which is operative as the tape sending side is controlled on the basis of the tension applied to the magnetic tape 2 between the rotary head drum 1 and the take-up reel T. In such control, the ratio of the magnetic-tape tension measured at a tape-tension measurement point to the tension of the portion of the magnetic tape 2 which is wrapped around the rotary head drum 1 varies due to a change of set tape speeds or variations in a tape speed. As a result, the tape tension of the portion of the magnetic tape 2 which is wrapped around the rotary head drum 1 becomes unstable.

Another disadvantage is that the travelling performance of the magnetic tape 2 is easily influenced by environmental conditions such as temperature and humidity.

SUMMARY OF THE INVENTION

An object of the present invention which has been made in order to solve the problems of the above-described related art is to provide a magnetic recording or reproducing apparatus which can cause a magnetic tape to stably travel at a prescribed speed and tension irrespective of whether the magnetic tape is made to travel in a forward or rearward direction.

To achieve the above object, in accordance with one aspect of the present invention, there is provided a magnetic recording or reproducing apparatus for recording or reproducing a signal on or from a magnetic tape while causing the magnetic tape to travel in a state wherein it is wrapped around a rotary head drum provided with a magnetic head. The apparatus comprises speed detecting means for detecting a speed of the magnetic tape, supply-reel-side tension detecting means for detecting a tension of the magnetic tape between the rotary head drum and a supply reel, take-up-reel-side tension detecting means for detecting a tension of the magnetic tape between the rotary head drum and a take-up reel, and a control signal switching device for switching control signals in accordance with whether the magnetic tape is made to travel in a forward or rearward direction. In the above-described arrangement, while the magnetic tape is being made to travel, a detected-speed signal provided by the speed detecting means is compared with a predetermined reference value to obtain a control signal. A driving motor coupled to one of the supply reel and the take-up reel which is operative as a tape receiving side during the travel of the magnetic tape is controlled on the basis of the control signal. In the meantime, a detected-tension value provided by the supply-reel-side tension detecting means and a detected-tension value provided by the take-up-reel-side tension detecting means are respectively multiplied by coefficients, and are added together to provide a sum. The sum is compared with a predetermined reference value to obtain a control signal. A driving motor coupled to the other of the supply reel and the take-up reel which is operative as a tape sending side during the travel of the magnetic tape is controlled on the basis of this control signal.

In the above-described arrangement, in a case where an exchange of signals is performed with the magnetic tape while the magnetic tape is being made to travel in the state of being wrapped around the rotary head drum equipped with the magnetic head, the speed detecting means detects the speed of the magnetic tape, and the supply-reel-side tension detecting means detects the tension of the magnetic tape between the rotary head drum and the supply reel, whereas the take-up-reel-side tension detecting means detects the tension of the magnetic tape between the rotary head drum and the take-up reel. The control signal switching device switches the control signals in accordance with whether the magnetic tape is made to travel in the forward or rearward direction.

If the magnetic tape is made to travel in either direction, whether the forward direction or the rearward direction, the control signals are switched correspondingly by the control signal switching devices. Accordingly, during the travel of the magnetic tape, a detected-speed signal provided by the speed detecting means is compared with a reference value to obtain the control signal, and the driving motor coupled to the reel which is operative as the tape receiving side during the travel of the magnetic tape is controlled on the basis of the control signal. A detected-tension value provided by the supply-reel-side tension detecting means and a detected-tension value provided by the take-up-reel-side tension detecting means are respectively multiplied by the coefficients, and are added together to provide a sum. The sum is compared with a reference value to obtain the control signal, and the driving motor coupled to the reel which is operative as the tape sending side during the travel of the magnetic tape is controlled on the basis of the control signal. Accordingly, it is possible to apply prescribed tension to the magnetic tape and cause it to travel in stable contact with the rotary head drum at a prescribed speed.

In accordance with another aspect of the present invention, there is provided a magnetic recording or reproducing apparatus which comprises speed detecting means for detecting a speed of a magnetic tape, supply-reel-side tension detecting means for detecting a tension of the magnetic tape between the rotary head drum and a supply reel take-up-reel-side tension detecting means for detecting a tension of the magnetic tape between the rotary head drum and a take-up reel, coefficient selecting means for selecting each coefficient to be multiplied by a respective one of the detected-tension values on the basis of a condition other than the tension of the magnetic tape, and a control signal switching device for switching control signals in accordance with whether the magnetic tape is made to travel in a forward or rearward direction.

In the above-described arrangement, while the magnetic tape is being made to travel, a detected-speed signal provided by the speed detecting means is compared with a predetermined reference value to obtain a control signal. A driving motor coupled to one of the supply reel and the take-up reel which is operative as a tape receiving side during the travel of the magnetic tape is controlled on the basis of the control signal. In the meantime, a detected-tension value provided by the supply-reel-side tension detecting means and a detected-tension value provided by the take-up-reel-side tension detecting means are respectively multiplied by coefficients selected by the coefficient selecting means, and are added together to provide a sum. The sum is compared with a predetermined reference value to obtain a control signal. A driving motor coupled to the other of the supply reel and the take-up reel which is operative as a tape sending side during the travel of the magnetic tape is controlled on the basis of this control signal.

In the above-described arrangement, in a case where an exchange of signals is performed with the magnetic tape while the magnetic tape is being made to travel in the state of being wrapped around the rotary head drum equipped with the magnetic head, the speed detecting means detects the speed of the magnetic tape, and the supply-reel-side tension detecting means detects the tension of the magnetic tape between the rotary head drum and the supply reel, whereas the take-up-reel-side tension detecting means detects the tension of the magnetic tape between the rotary head drum and the take-up reel. The coefficient selecting means selects each coefficient to be multiplied by a respective one of the detected-tension values on the basis of a condition other than the tension of the magnetic tape. The control signal switching device switches the control signals in accordance with whether the magnetic tape is made to travel in the forward or rearward direction.

If the magnetic tape is made to travel in either direction, whether the forward direction or the rearward direction, the control signals are switched correspondingly by the control signal switching device. Accordingly, a detected-speed signal provided by the speed detecting means is compared with a reference value to obtain a control signal, and the driving motor coupled to the reel which is operative as the tape receiving side during the travel of the magnetic tape is controlled on the basis of the control signal. A detected-tension value provided by the supply-reel-side tension detecting means and a detected-tension value provided by the take-up-reel-side tension detecting means are respectively multiplied by the coefficients, and are added together to provide a sum. The sum is compared with a reference value to obtain a control signal, and the driving motor coupled to the reel which is operative as the tape sending side during the travel of the magnetic tape is controlled on the basis of the control signal. Accordingly, it is possible to apply prescribed tension to the magnetic tape without being influenced by environmental conditions and cause it to travel in stable contact with the rotary head drum at a prescribed speed.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of a magnetic recording or reproducing apparatus according to the present invention will be described below with reference to the accompanying drawings. Each embodiment which will be described hereinbelow is provided with a magnetic-tape transporting system which causes a magnetic tape to travel while wrapping it by a predetermined angle around a rotary head drum equipped with a magnetic head. For recording or reproduction, the magnetic tape is made to travel in the forward (FWD) direction and, for rewinding, in the rearward (REW) direction. A primary feature of the present invention resides in a reel servo system for causing the magnetic tape to travel optimally. The following description concentrates on such a reel servo system.

First Embodiment

Figure 1:
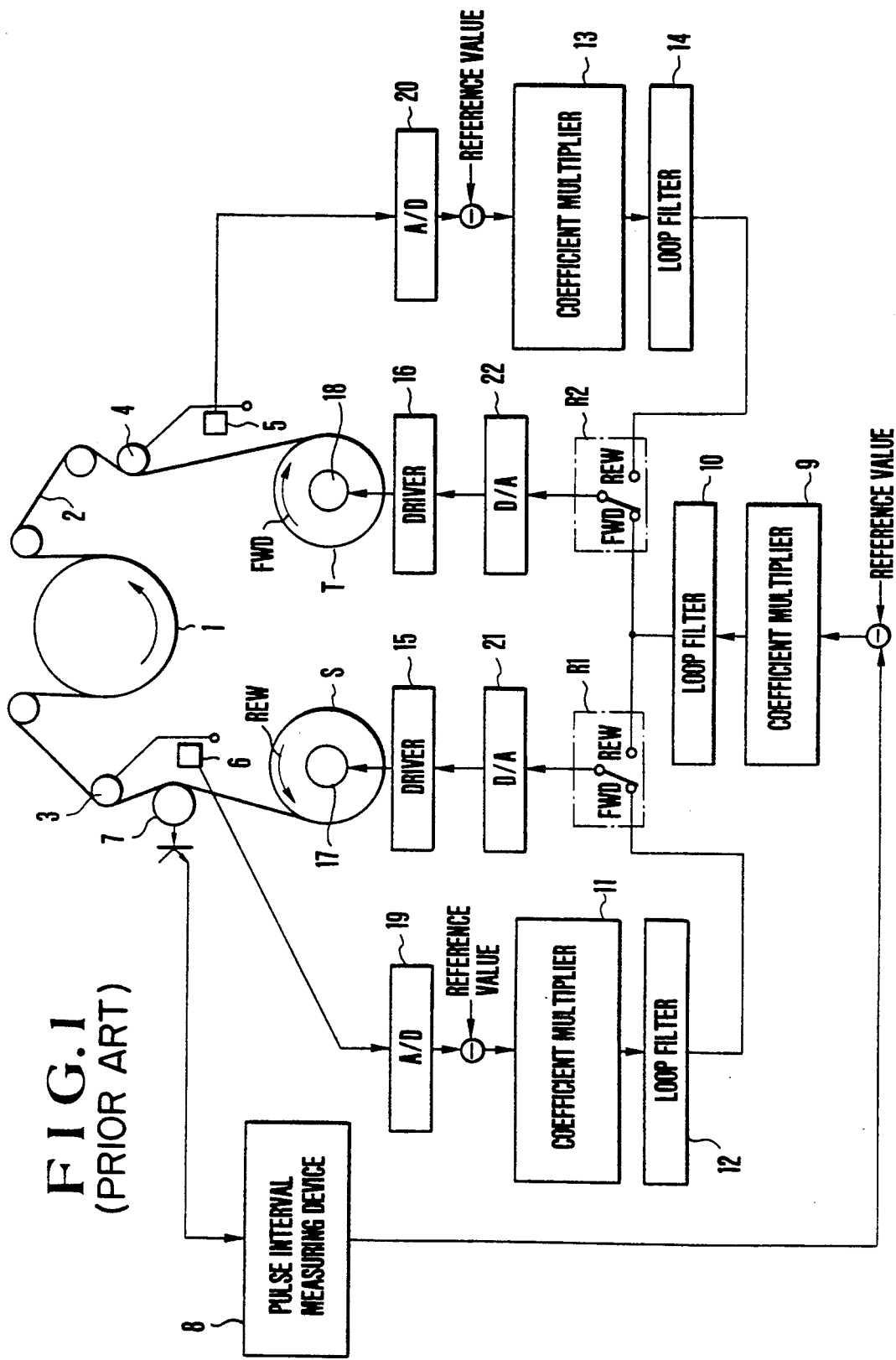
FIG. 1 is a block diagram of a reel servo system according to a related art.
Figure 2:
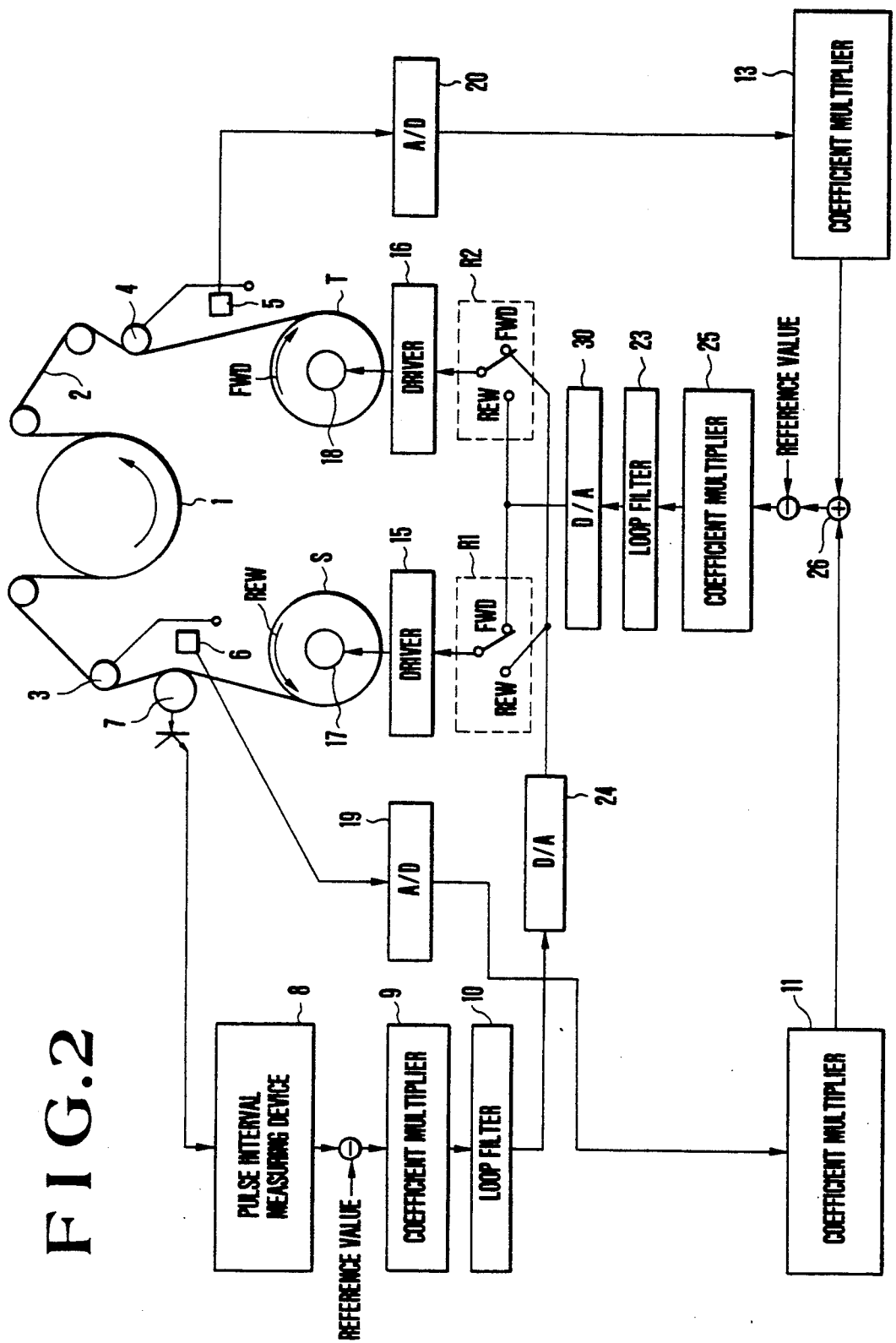
FIG. 2 is a block diagram of a reel servo system according to a first embodiment of the present invention.

FIG. 2 is a block diagram showing the arrangement of a reel servo system according to a first embodiment of the present invention. The shown reel servo system includes a supply reel S, a take-up reel T, and control signal switching devices R1 and R2. The shown setting of the control signal switching devices R1 and R2 represents that a magnetic tape 2 is being made to travel in the FW direction. The reel servo system also includes a rotary head drum 1 for picking up a signal from the portion of the magnetic tape 2 which is wrapped around the rotary head drum 1 during the travel of the magnetic tape 2, pins 3 and 4 for tension detection which move their positions in accordance with the tension of the magnetic tape 2, Hall elements 5 and 6 for outputting voltages corresponding to the positional movements of the respective pins 4 and 3, a timer roller 7 for outputting a magnetic-tape travel signal while it is rotating with the travel of the magnetic tape 2, a pulse interval measuring device 8 for measuring the period of a magnetic-tape travel signal outputted from the timer roller 7, coefficient multipliers 9, 11, 13 and 25 for multiplying input data by their coefficients and outputting the respective results, loop filters 10 and 23 for stabilizing the loop of the reel servo system, a driver 15 for driving a reel motor 17 coupled to the supply reel S, a driver 16 for driving a reel motor 18 coupled to the take-up reel T, the reel motor 17 for driving the supply reel S, the reel motor 18 for driving the take-up reel T, analog-to-digital (A/D) converters 19 and 20, digital-to-analog (D/A) converters 24 and 30, and an adder 26.

In the above-described arrangement, while the magnetic tape 2 is being made to travel in the FWD direction, the timer roller 7 outputs a magnetic-tape travel signal while rotating with the travel of the magnetic tape 2, and the pulse interval measuring device 8 measures and detects the period of the magnetic-tape travel signal. The data outputted from the pulse interval measuring device 8 is compared with reference speed data to obtain error data. The coefficient multiplier 9 multiplies the error data by its coefficient and supplies the result to the loop filter 10. The data signal passed through the loop filter 10 is converted into an analog signal by the D/A converter 24. The converted analog signal is supplied as a control signal to the driver 16 coupled to the take-up reel T, thereby providing speed control over the reel motor 18 coupled to the take-up reel T.

During the above-described operation, the Hall element 6 detects the position of the pin 3 which moves in accordance with the tension of the magnetic tape 2 on the entry side of the rotary head drum 1, and supplies the detection result to the A/D converter 19. The A/D converter 19 digitizes the detection result and outputs the digital data to the coefficient multiplier 11. The coefficient multiplier 11 multiplies the digital data by its coefficient and supplies the result to the adder 26. In the meantime, the Hall element 5 detects the position of the pin 4 which moves in accordance with the tension of the magnetic tape 2 on the exit side of the rotary head drum 1, and supplies the detection result to the A/D converter 20. The A/D converter 20 digitizes the detection result and outputs the digital data to the coefficient multiplier 13. The coefficient multiplier 13 multiplies the digital data by its coefficient and supplies the result to the adder 26. The adder 26 weight-averages the data supplied from the coefficient multipliers 11 and 13, and the result is compared with reference value data to obtain error data. The coefficient multiplier 25 multiplies the error data by its coefficient and supplies the result to the loop filter 23. The data signal passed through the loop filter 23 and the D/A converter 30 is inputted as a control signal into the driver 15 coupled to the supply reel S. On the basis of the input control signal, the driver 15 coupled to the supply reel S drives the reel motor 17 coupled to the supply reel S.

As described above, while the magnetic tape 2 is being made to travel in the FWD direction, the reel motor 18 coupled to the take-up reel T is placed under speed control, whereas the reel motor 17 coupled to the supply reel S is controlled on the basis of the control signal corresponding to the tension of the magnetic tape 2.

If the magnetic tape 2 is made to travel in the REW direction, the control signal switching devices R1 and R2, respectively, are switched correspondingly so that a motor coupled to a reel which is operative as a tape receiving side, i.e., the reel motor 17 coupled to the supply reel S, is placed under speed control, whereas a motor coupled to a reel which is operative as a tape sending side, i.e., the reel motor 18 coupled to the take-up reel T, is controlled on the basis of the control signal corresponding to the tension of the magnetic tape 2.

In other words, the timer roller 7 and the pulse interval measuring device 8 form a speed detecting means, and the pin 3 and the Hall element 6 form a supply-reel-side tension detecting means, while the pin 4 and the Hall element 5 form a take-up-reel-side tension detecting means. While the magnetic tape 2 is being made to travel in either direction, whether the FWD direction or the REW direction, a detected-speed signal provided by the speed detecting means is compared with a reference value to obtain a control signal and the driving motor coupled to a reel which is operative as the tape receiving side is controlled on the basis of the control signal. The detection values provided by the supply-reel-side tension detecting means and the take-up-reel-side tension detecting means are respectively multiplied by coefficients and the results are added. The sum is compared with a reference value to obtain a control signal, thus controlling, on the basis of the control signal, the driving motor coupled to a reel which is operative as the tape sending side during the travel of the magnetic tape 2.

As is apparent from the foregoing, according to the above-described embodiment, in a case where an exchange of signals is performed with a magnetic tape while the magnetic tape is being made to travel in the stat of being wrapped around a rotary head drum equipped with a magnetic head, the speed detecting means detects the speed of the magnetic tape between the rotary head drum and the supply reel which is operative as the tape sending side while the magnetic tape is being made to travel for recording or reproduction. Meanwhile, the supply-reel-side tension detecting means detects the tension of the magnetic tape between the rotary head drum and the supply reel, whereas the take-up-reel-side tension detecting means detects the tension of the magnetic tape between the rotary head drum and the take-up reel.

If the magnetic tape is made to travel in either direction, whether the forward direction or the rearward direction, the control signals are switched correspondingly by the control signal switching devices. Accordingly, during the travel of the magnetic tape, a detected-speed signal provided by the speed detecting means is compared with a reference value to obtain a control signal, and a driving motor coupled to a reel which is operative as the tape receiving side during the travel of the magnetic tape is controlled on the basis of the control signal. A detected-tension value provided by the supply-reel-side tension detecting means and a detected-tension value provided by the take-up-reel-side tension detecting means are respectively multiplied by coefficients and the results are added. The sum is compared with a reference value to obtain a control signal, and a driving motor coupled to a reel which is operative as the tape sending side during the travel of the magnetic tape is controlled on the basis of the control signal. Accordingly, whether the magnetic tape is being made to travel in the forward direction or the rearward direction, it is possible to apply prescribed tension to the magnetic tape and cause it to travel in stable contact with the rotary head drum at a prescribed speed. In consequence, it is possible to reduce tension variations in the portion of the magnetic tape which is wrapped around the rotary head drum, which may be caused by a change of the set travelling speeds of the magnetic tape or a variation in the travelling speed of the magnetic tape, whereby it is possible to provide a magnetic recording or reproducing apparatus which is capable of recording or reproduction of improved fidelity and stability.

Second Embodiment

Figure 3:
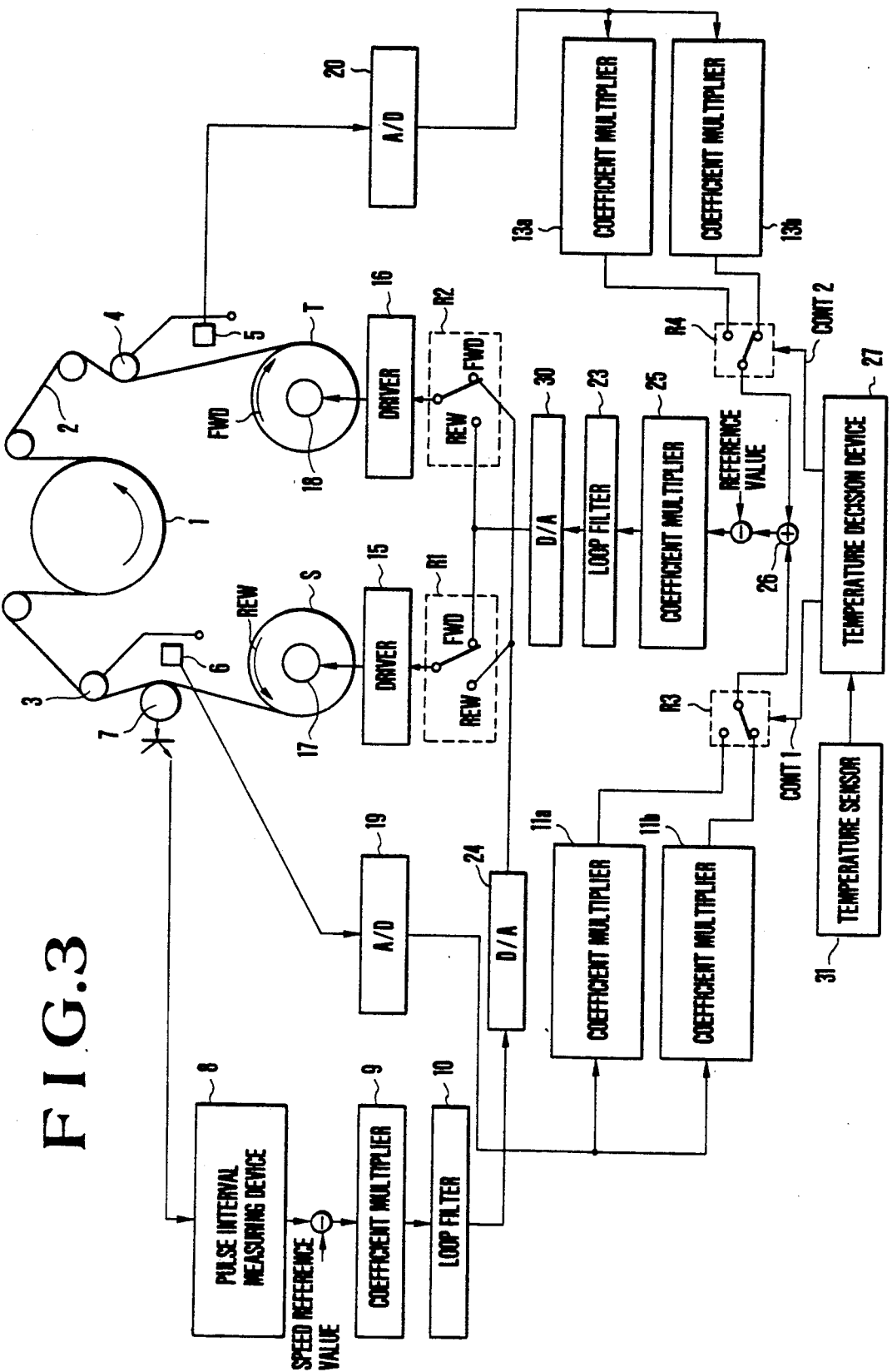
FIG. 3 is a block diagram of a reel servo system according to a second embodiment of the present invention.

A second embodiment will be described below with reference to FIG. 3. In FIG. 3, the same reference numerals are used to denote constituent elements which are the same as or correspond to those used in the first embodiment, and description is omitted.

The shown reel servo system comprises a temperature decision device 27 for receiving temperature data from a temperature sensor 31 which performs temperature detection in the vicinity of the rotary head drum 1, and outputting a switching control signal on the basis of the received temperature data value. The reel servo system also comprises coefficient switching devices R3 and R4 for performing switching, respectively, between coefficient multipliers 11a and 11b and between coefficient multipliers 13a and 13b on the basis of an output signal from the temperature decision device 27.

In operation, the Hall element 6 detects the position of the pin 3 which moves in accordance with the tension of the magnetic tape 2 on the entry side of the rotary head drum 1, and supplies the detection result to the A/D converter 19. The A/D converter 19 digitizes the detection result and outputs the digital data to each of the coefficient multipliers 11a and 11b. The coefficient multipliers 11a and 11b multiply the digital data by different coefficients i and j (i>j).

In the meantime, the Hall element 5 detects the position of the pin 4 which moves in accordance with the tension of the magnetic tape 2 on the exit side of the rotary head drum 1, and supplies the detection result to the A/D converter 20. The A/D converter 20 digitizes the detection result and outputs the digital data to each of the coefficient multipliers 13g and 13b. The coefficient multipliers 13g and 13b multiply the digital data by different coefficients m and n (m>n).

Figure 4:
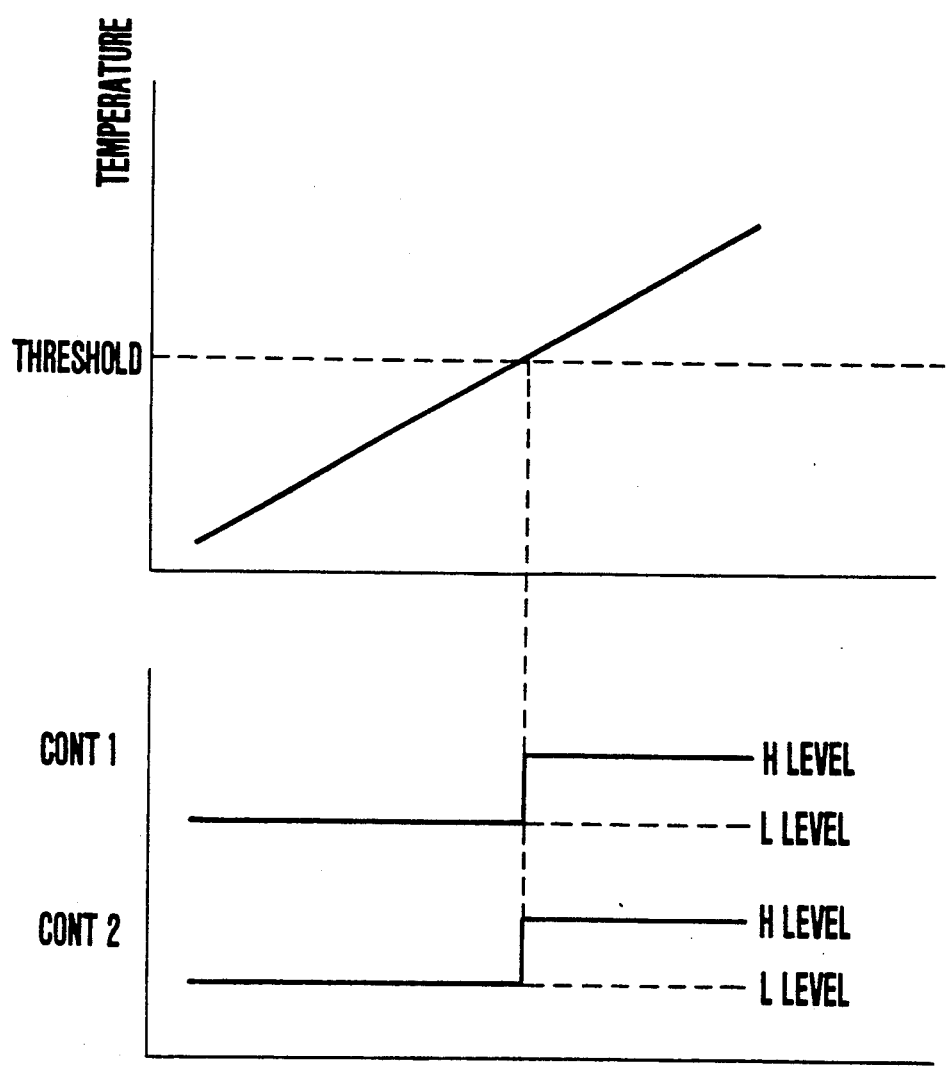
FIG. 4 is an explanatory diagram representing switching control signals outputted from a temperature decision device used in the second embodiment.

FIG. 4 is an explanatory diagram representing the relationship between temperatures and switching control signals for input to the coefficient switching devices R3 and R4 during the operation of the temperature decision device 27. If the temperature data supplied from the temperature sensor 31 to the temperature decision device 27 indicates a value below a threshold, the temperature decision device 27 outputs switching control signals CONT1 and CONT2 at their low (L) levels to the respective coefficient switching devices R3 and R4. If such temperature data indicates a value above the threshold, the temperature decision device 27 outputs the switching control signals CONT1 and CONT2 at their high (H) levels to the respective coefficient switching devices R3 and R4.

On the basis of the switching control signals CONT1 and CONT2 supplied from the temperature decision device 27, the coefficient switching devices R3 and R4 perform switching, respectively, between the coefficient multipliers 11a and 11b and between the coefficient multipliers 13g and 13b. Since the load of the magnetic-tape transporting system becomes lower as temperature becomes higher, in the case of a high temperature, the coefficient multipliers 11a and 13g which respectively have the larger coefficients i and m are selected, while the coefficient multipliers 11b and 13b are selected in the case of a low temperature.

Then, the adder 26 adds the data outputted from the coefficient switching devices R3 and R4 to obtain weight-averaged data. The weight-averaged data is compared with a reference value to obtain error data. The coefficient multiplier 25 multiplies the error data by its coefficient and supplies the result t the loop filter 23. The data signal passed through the loop filter 23 and the D/A converter 30 is inputted as a control signal into the driver 15 coupled to the supply reel S. On the basis of the input control signal, the driver 15 coupled to the supply reel S controls and drives the reel motor 17 for the supply reel S.

As described above, while the magnetic tape 2 is being made to travel in the FWD direction, the reel motor 18 coupled to the take-up reel T is placed under speed control, whereas the reel motor 17 coupled to the supply reel S is controlled in accordance with the control signal based on a signal which is obtained by obtaining respective tension signals as to the magnetic tape 2 on the entry and exit sides of the rotary head drum 1 and weight-averaging the respective tension signals with coefficients based on temperature.

If the magnetic tape 2 is made to travel in the REW direction, the control signal switching devices R1 and R2, respectively, are switched correspondingly so that a motor coupled to a reel which is operative as the tape receiving side, i.e., the reel motor 17 coupled to the supply reel S, is placed under speed control, whereas a motor coupled to a reel which is operative as the tape sending side, i.e., the reel motor 18 coupled to the take-up reel T, is controlled in accordance with the control signal based on a signal which is obtained by obtaining respective tension signals as to the magnetic tape 2 on the entry and exit sides of the rotary head drum 1 and weight-averaging the respective tension signals with coefficients based on temperature.

In other words, the timer roller 7 and the pulse interval measuring device 8 form a speed detecting means, the pin 3 and the Hall element 6 form a supply-reel-side tension detecting means, the pin 4 and the Hall element 5 form a take-up-reel-side tension detecting means, and the coefficient switching devices R3 and R4 and the temperature decision device 27 form a coefficient selecting means.

While the magnetic tape 2 is being made to travel in either direction, whether the FWD direction or the REW direction, a detected-speed signal provided by the speed detecting means is compared with a reference value to obtain a control signal and the driving motor coupled to a reel which is operative as the tape receiving side during the travel of the magnetic tape 2 is controlled on the basis of the control signal. The detection values provided by the supply-reel-side tension detecting means and the take-up-reel-side tension detecting means are respectively multiplied by coefficients corresponding to different temperatures, and the results are added. The sum is compared with a reference value to obtain a control signal, thus controlling, on the basis of the control signal, the driving motor coupled to a reel which is operative as the tape sending side during the travel of the magnetic tape 2.

With the above-described arrangement, while the magnetic tape is being made to travel, it is possible to cause the magnetic tape to travel stably at prescribed tension and speed during any of recording, reproduction and rewinding operations.

Third Embodiment

Figure 5:
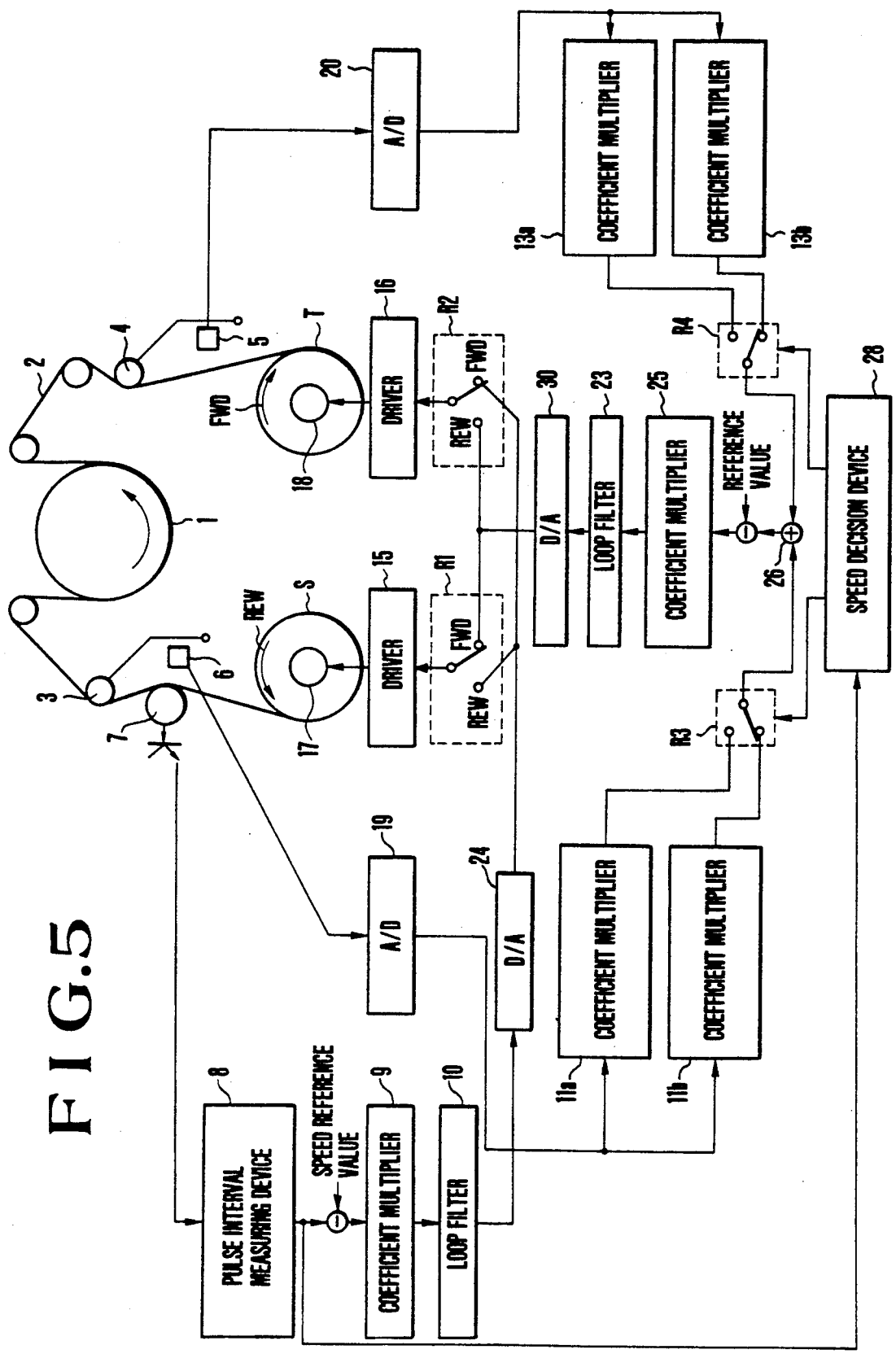
FIG. 5 is a block diagram of a reel servo system according to a third embodiment of the present invention.

FIG. 5 is a block diagram showing the arrangement of a reel servo system according to a third embodiment of the present invention. In FIG. 5, the same reference numerals are used to denote constituent elements which are the same as or correspond to those used in either of the first and second embodiments, and description is omitted.

A primary feature of the third embodiment resides in an arrangement in which coefficients used for weight-averaging tension signals as to the magnetic tape 2 which are obtained on opposite sides of the rotary head drum 1 are switched on the basis of the travelling speed of the magnetic tape 2. In operation, a speed decision device 28 compares an output signal from the pulse interval measuring device 8 with a threshold value, and outputs a switching control signal. On the basis of this switching control signal, the coefficient switching devices R3 and R4 perform switching operations so that the coefficient multipliers 11a or 11b and 13g or 13b are selected. Since the load of the magnetic-tape transporting system becomes lower as the travelling speed of the magnetic tape 2 becomes faster, such selection is performed so that, if the travelling speed of the magnetic tape 2 is fast, the coefficient multipliers 11a and 13g which have large coefficients are selected. The data outputted from the coefficient switching devices R3 and R4 are inputted to the adder 26.

Although the selection from the coefficient multipliers is performed, in the case of the second embodiment, on the basis of temperature and, in the case of the third embodiment, on the basis of the travelling speed of the magnetic tape, such selection may be performed on the basis of humidity measured in the vicinity of the rotary head drum. The switching between the coefficient multipliers may also be accomplished by an arbitrary combination of temperature, travelling speed and humidity. Since the load of the magnetic-tape transporting system becomes higher as humidity becomes higher, the coefficient multipliers may be switched in a manner similar to that used in each of the aforesaid embodiments.

In other words, in the second and third embodiments, each coefficient to be multiplied by a respective one of the detected-tension values of the magnetic tape is selected on the basis of a condition other than the tension detected during the travel of the magnetic tape. The detected-tension values are multiplied by the respective selected coefficients, and are added together to provide a sum. The sum is compared with a reference value to obtain a control signal. On the basis of this control signal, a driving motor coupled to a reel which is operative as the tape sending side during the travel of the magnetic tape is controlled.

With the above-described arrangement, it is possible to cause the magnetic tape to travel more stably than in any of the previously-described embodiments.

As described above, according to each of the second and third embodiments, in a case where an exchange of signals is performed with the magnetic tape while the magnetic tape is being made to travel in the state of being wrapped around the rotary head drum equipped with the magnetic head the speed detecting means detects the speed of the magnetic tape between the rotary head drum and the supply reel which is operative as the tape sending side while the magnetic tape is being made to travel for recording or reproduction. Meanwhile, the supply-reel-side tension detecting means detects the tension of the magnetic tape between the rotary head drum and the supply reel, whereas the take-up-reel-side tension detecting means detects the tension of the magnetic tape between the rotary head drum and the take-up reel. The coefficient selecting means selects each coefficient to be multiplied by a respective one of the detected-tension values on the basis of a condition other than the tension of the magnetic tape.

If the magnetic tape is made to travel in either direction, whether the forward direction or the rearward direction, the control signals are switched correspondingly by the control signal switching devices. Accordingly, during the travel of the magnetic tape, a detected-speed signal provided by the speed detecting means is compared with a reference value to obtain a control signal, and a driving motor coupled to a reel which is operative as the tape receiving side during the travel of the magnetic tape is controlled on the basis of the control signal. A detected-tension value provided by the supply-reel-side tension detecting means and a detected-tension value provided by the take-up-reel-side tension detecting means are respectively multiplied by coefficients and the results are added. The sum is compared with a reference value to obtain a control signal, and a driving motor coupled to a reel which is operative as the tape sending side during the travel of the magnetic tape is controlled on the basis of the control signal. Accordingly, whether the magnetic tape is being made to travel in the forward direction or the rearward direction, it is possible to apply prescribed tension to the magnetic tape and cause it to travel in stable contact with the rotary head drum at a prescribed speed. In consequence, it is possible to keep constant the tension of the portion of the magnetic tape which is wrapped around the rotary head drum during the travel of the magnetic tape, even if not only a change of the set travelling speeds of the magnetic tape or a variation in the travelling speed of the magnetic tape, but also variations in environmental conditions, such as temperature, humidity or magnetic-tape speed, give rise to variations in the tension ratio of the magnetic tape. Such variations may occur in a location on the entry side of the rotary head drum where detection of the tension of the magnetic tape is performed; in the portion of the magnetic tape which is wrapped around the rotary head drum during the travel of the magnetic tape; or in a location on the exit side of the rotary head drum where detection of the tension of the magnetic tape is performed. Accordingly, it is possible to provide a magnetic recording or reproducing apparatus which is capable of recording or reproduction of improved fidelity and stability.

What is claimed is:

1. A magnetic recording or reproducing apparatus for recording a reproducing a signal on or from a magnetic tape while causing the magnetic tape to travel in the state of being wrapped around a rotary head drum provided with a magnetic head, comprising:
    (a) speed detecting means for detecting a speed of the magnetic tape;
    (b) supply-reel-side tension detecting means for detecting a tension of the magnetic tape between the rotary head drum and a supply reel which is operative as a magnetic-tape sending side;
    (c) take-up-reel-side tension detecting means for detecting a tension of the magnetic tape between the rotary head drum and a take-up reel;
    (d) first driving means for driving the supply reel;
    (e) second driving means for driving the take-up reel;
    (f) control signal switching means for switching control signal for control of said first and second driving means in accordance with whether the magnetic tape is made to travel in a forward or rearward direction;
    (g) a first comparing means for comparing a detection result provided by said speed detecting means with a predetermined reference value;
    (h) first transmitting means for transmitting a result provided by said first comparing means to said control signal switching means as a first control signal;
    (i) adding means for adding a detection result provided by said supply-reel-side tension detecting means to a detection result provided by said take-up-reel-side tension detecting means to provide a tape tension as a sum;
    (j) second comparing means for comparing the tape tension provided by said adding means with a predetermined reference value; and
    (k) second transmitting means for transmitting a result provides by said second comparing means to said control signal switching means as a second control signal.

2. A magnetic recording or reproducing apparatus according to claim 1, wherein the respective detection results provided by said supply-reel-side tension detecting means and said take-up-reel-side tension detecting means ar multiplied by predetermined coefficients and added by said adding means.

3. A magnetic recording or reproducing apparatus for recording or reproducing a signal on or from a magnetic tape while causing the magnetic tape to travel in the state of being wrapped around a rotary head drum provided with a magnetic head, comprising:
    (a) supply-reel-side tension detecting mean for detecting a tension of the magnetic tape between the rotary head drum and a supply reel which is operative as a magnetic-tape sending side;

(b) take-up-reel-side tension detecting means for detecting a tension of the magnetic tape between the rotary head drum and a take-up reel;

(c) two driving means for driving the supply reel and reel, respectively;

(d) control signal switching means for switching signals for control of said two driving means in accordance with whether the magnetic tape is made to travel in a forward or rearward direction;

(e) adding means for adding a detection result provided by said supply-reel-side tension detecting means to a detection result provided by said take-up-reel-side tension detecting means to provide a tape tension as a sum;

(f) comparing means for comparing the tape tension provided by said adding means with a predetermined reference value; and (g) transmitting means for transmitting a result provided by said comparing means to said control signal switching means as a control signal.

4. A magnetic recording or reproducing apparatus according to claim 3, wherein said control signal comprises a speed signal indicative of a travelling speed of the magnetic tape.

5. A magnetic recording or reproducing apparatus according to claim 3, wherein the respective detection results provided by said supply-reel-side tension detecting means and said take-up-reel-side tension detecting means are multiplied by predetermined coefficients and added by said adding means.

6. A magnetic recording or reproducing apparatus for recording or reproducing a signal on or from a magnetic tape while causing the magnetic tape to travel in the state of being wrapped around a rotary head drum provided with a magnetic head, comprising:

(a) supply-reel-side tension detecting means for detecting a tension of the magnetic tape between the rotary head drum and a supply reel which is operative as a magnetic-tape sending side;

(b) take-up-reel-side tension detecting means for detecting a tension of the magnetic tape between the rotary head drum and a take-up reel;

(c) a plurality of coefficient multiplying means for multiplying predetermined coefficients by respective detection results provided by said supply-reel-side tension detecting means and said take-up-reel-side tension detecting means;

(d) selecting means for performing selection from said plurality of coefficient multiplying means;

(e) two driving means for driving the supply reel and the take-up reel, respectively;

(f) control signal switching means for switching signals for control of said two driving means in accordance with whether the magnetic tape is made to travel in a forward or rearward direction;

(g) adding means for adding a value indicative of a detected supply-reel-side tension to a value indicative of a detected take-up-reel-side tension which values each have passed through a coefficient multiplying means selected by said selecting means, thereby providing a tape tension as a sum;

(h) comparing means for comparing the tape tension provided by said adding means with a predetermined reference value; and (i) transmitting means for transmitting a result provided by said comparing means to said control signal switching means as a control signal.

7. A magnetic recording or reproducing apparatus according to claim 6, wherein said selecting means performs selection from said plurality of coefficient multiplying means on the basis of a condition other than a tension of the magnetic tape.

8. A magnetic recording or reproducing apparatus according to claim 7, wherein the condition other than the tension of the magnetic tape is a temperature.

9. A magnetic recording or reproducing apparatus according to claim 8, wherein the temperature is a temperature in the vicinity of the rotary head drum.

10. A magnetic recording or reproducing apparatus according to claim 7, wherein the condition other than the tension of the magnetic tape is a speed of the magnetic tape.

11. A magnetic recording or reproducing apparatus according to claim 10, wherein the speed of the magnetic tape is a speed measured between the rotary head drum and the supply reel.

12. A magnetic recording or reproducing apparatus for recording or reproducing a signal on or from a tape while maintaining the tape in contact with a head, comprising:

(a) first tension detecting means for detecting a tension of the tap between the head and a supply reel which is operative as a tape sending side;

(b) second tension detecting means for detecting a tension of the tape between the head and a take-up reel;

(c) computing means for adding together detection results provided by said respective first and second tension detecting means; and (d) controlling means for controlling driving of one of the supply and take-up reels on the basis of a result provided by said computing means.

13. A magnetic recording or reproducing apparatus according to claim 12, wherein the one whose driving is controlled on the basis of the result provided by said computing means is the supply reel.

14. A method for controlling a magnetic recording or reproducing apparatus for recording or reproducing a signal on or from a magnetic tape while causing the magnetic tape to travel in the state of being wrapped around a rotary head drum provided with a magnetic head, comprising the steps of:

(a) detecting a tension of the magnetic tape between the rotary head drum and a supply reel which is operative as a tape sending side and a tension of the magnetic tape between the rotary head drum and a take-up reel;

(b) multiplying predetermined coefficients by respective detected-tension values;

(c) adding the detected-tension values multiplied by the predetermined coefficients to obtain a sum of the detected-tension values;

(d) comparing the sum with a predetermined reference value; and (e) controlling driving of one of the supply and takeup reels on the basis of a comparison result obtained in said step (d).

15. A method according to claim 14, wherein the one whose driving is controlled in said step (e) is the supply reel.

16. A method according to claim 14 or 15, wherein each of the detected-tension values is multiplied by a predetermined coefficient which is selected from among a plurality of predetermined coefficients on the basis of a predetermined condition.

17. A method according to claim 16, wherein said predetermined condition is a condition other than a tension of the magnetic tape.

18. A method according to claim 17, wherein the condition other than the tension is a speed of the magnetic tape.

19. A method according to claim 18, wherein the speed of the magnetic tape is a speed measured between the rotary head drum and the supply reel.

20. A method according to claim 17, wherein the condition other than the tension of the magnetic tape is a temperature.

21. A method according to claim 20, wherein the temperature is a temperature in the vicinity of the rotary head drum.

22. A method according to claim 17, wherein the condition other than the tension is a humidity.

23. A method according to claim 22, wherein the humidity is a humidity in the vicinity of the rotary head drum.

24. An apparatus for recording or reproducing a signal on or from a tape transported between a first reel and a second reel, comprising:
(a) recording or reproducing means for recording or reproducing a signal on or from the tape;
(b) first detecting means for detecting a tension of the tape between said first reel and said recording or reproducing means and outputting first tension information;
(c) second detecting means for detecting a tension of the tape between said second reel and said recording or reproducing means and outputting second tension information;
(d) speed detecting means for detecting a speed of the tape and outputting speed information; and
(e) controlling means for controlling one of said first and second reels on the basis of the speed information and controlling the other on the basis of both said first tension information and said second tension information.

* * * * *

UNITED STATES PATENT AND TRADEMARK OFFICE
CERTIFICATE OF CORRECTION

PATENT NO. : 5,313,343
DATED : May 17, 1994
INVENTOR(S) : Canon Kabushiki Kaisha It is certified that error appears in the above-indentified patent and that said Letters Patent is hereby corrected as shown below:

Column 4, line 34, after "reel" insert --,-- column 6, line 16 change "FW" to --FWD-- column 9, line 27, change "13g" to --13a-- column 9, line 36, change "t" to --to-- column 10, lines 49, 54 change "13g" to --13a-- column 11, line 23, after "head" insert --,-- column 12, line 51, change "provides" to --provided-- column 12, line 58, change "ar" to --are-- column 13, line 5, before "reel" insert -- the take-up--.

column 14, line 25, change "tap" to --tape--

Signed and Sealed this

First Day of November, 1994

Attest:

BRUCE LEHMAN

*Attesting Officer*   *Commissioner of Patents and Trademarks*